(12) United States Patent
Fujii et al.

(10) Patent No.: US 8,454,041 B2
(45) Date of Patent: Jun. 4, 2013

(54) SUSPENSION ARM UNIT FOR VEHICLE

(75) Inventors: Takashi Fujii, Sakai (JP); Shoichiro Kawamura, Hannan (JP); Yuhei Nishimura, Sakai (JP); Shinichiro Saji, Sakai (JP); Kyouhei Hamamura, Sakai (JP)

(73) Assignee: Kubota Corporation, Osaka (JP)

( * ) Notice: Subject to any disclaimer, the term of this patent is extended or adjusted under 35 U.S.C. 154(b) by 103 days.

(21) Appl. No.: 13/051,485

(22) Filed: Mar. 18, 2011

(65) Prior Publication Data

US 2012/0018973 A1    Jan. 26, 2012

(30) Foreign Application Priority Data

Jul. 21, 2010    (JP) ................................. 2010-164140

(51) Int. Cl.
*B60G 3/20* (2006.01)
*B60G 7/00* (2006.01)
*B60G 3/00* (2006.01)

(52) U.S. Cl.
USPC ...... 280/124.134; 280/124.125; 280/124.135; 280/124.136; 280/124.137; 29/897.2

(58) Field of Classification Search
USPC ......... 280/124.1, 124.125, 124.134, 124.135, 280/124.136, 124.137; 29/897.2
See application file for complete search history.

(56) References Cited

U.S. PATENT DOCUMENTS

| | | | |
|---|---|---|---|
| 7,261,307 B2 * | 8/2007 | Nuno et al. | 280/124.151 |
| 2004/0135337 A1 * | 7/2004 | Alesso et al. | 280/124.134 |
| 2008/0150249 A1 * | 6/2008 | Murata | 280/124.128 |
| 2012/0098228 A1 * | 4/2012 | Wilson et al. | 280/124.134 |

FOREIGN PATENT DOCUMENTS

JP    2001121933 A    5/2001

* cited by examiner

*Primary Examiner* — Ruth Ilan
*Assistant Examiner* — Darlene P Condra
(74) *Attorney, Agent, or Firm* — The Webb Law Firm

(57) ABSTRACT

A suspension arm unit for vehicle includes: a pair of profile beams each having a U-shaped cross section with an opening oriented in a horizontal direction and including: a base end part formed on one end side of the profile beam and vertically swingably supported on a vehicle body side about an axis extending in a front-rear direction; and a distal end part formed on the other end side, to which a knuckle arm unit of a wheel is attached. The pair of the profile beams are arranged in the front-rear direction so that the openings face each other in the front-rear direction and a gap between the profile beams becomes larger from the distal end part to the base end part, and the pair of the profile beams are connected to each other at the distal end part and to the knuckle arm unit through a rotary joint.

5 Claims, 8 Drawing Sheets

SUSPENSION ARM UNIT FOR VEHICLE

BACKGROUND

1. Field of the Invention

The present invention relates to a suspension arm unit having: a base end part vertically swingably supported on a vehicle body side about an axis extending in a front-rear direction of a vehicle; and a distal end part to which a knuckle arm unit of a wheel is attached.

2. Description of the Related Art

One example of this type of suspension arm is disclosed in Japanese Unexamined Patent Application Publication No. 2001-121933 (paragraphs 0020-0023, FIG. 1). In the suspension arm described in this patent document, a pair of fork-shaped members each extending in two directions from a single distal end part to two different base end parts are butted in a vertical direction, and side faces of two members are welded together to unify two members into a single piece. Two base end parts of the thus obtained arm are apart from each other in a front-rear direction of the vehicle, and vertically swingably supported on a vehicle body side. Each fork-shaped member has a U-shaped cross section and while openings of U shapes are butted each other in the vertical direction, the fork-shaped members are welded together except the distal end parts. Therefore, the arm except the distal end part has a hollow structure with a rectangular cross section. On the other hand, the distal end part has a plate structure which does not form a hollow structure even when two fork-shaped members are coupled in the vertical direction, so that a ball joint for connecting and supporting a knuckle arm is fixed simply with screws, without using a conventional mount member.

In the above-described conventional suspension arm, each arm member before welding has the U-shape as a cross sectional view and a fork-shape as a planar view having curved branches extending from the single distal end part to the two base end parts. In addition, the base end part and the distal end part should have totally different specific cross-sectional shapes. Therefore, in order to manufacture these arm members, special press molds each having a special curve shape are required, leading to a problem that a production cost is likely to become high. In addition, even when a slight design change is applied to, for example, a branching angle of the arm member, a new special press mold should be prepared.

Further, in a case where the distal end part having the closed rectangular cross section to which a knuckle can be attached is fabricated from a single steel plate using bending processing, the bending processing should be applied to at least three parts of the plate. Therefore, special press jigs and advanced press techniques are required, leading to an increase in the number of processing steps, and again the production cost is likely to become high.

SUMMARY OF THE INVENTION

In view of the above, it is desirable to provide a suspension arm unit for vehicle whose fabrication is simpler.

Accordingly, a suspension arm unit for vehicle according to the present invention includes a pair of profile beams each having a U-shaped cross section with an opening oriented in a horizontal direction, the profile beam including: a base end part which is formed on one end side of the profile beam and vertically swingably supported on a vehicle body side about an axis extending in a front-rear direction of a vehicle body; and a distal end part which is formed on the other end side of the profile beam and to which a knuckle arm unit is attached. In addition, the pair of the profile beams are arranged in the front-rear direction of the vehicle body so that the openings face each other in the front-rear direction of the vehicle body and a gap between the profile beams becomes larger from the distal end part to the base end part. Moreover, the pair of the profile beams are connected to each other at the distal end part thereof and connected to the knuckle arm unit through a rotary joint.

In the suspension arm of the present invention, the pair of the profile beams each having the U-shaped cross section are arranged in such a manner that the openings (of the U shapes) face each other, and the profile beams become gradually apart from each other from the distal end part to the base end part. With this configuration, by joining the distal end parts of the profile beams together, a suspension arm can be fabricated. Since a structure of the profile beam itself having the U-shaped cross section is simple, and the profile beam can be fabricated by a production method in three plates are welded or by bending processing on a single sheet metal using a very general mold and a simple press technique, the production cost can be effectively reduced. In addition, when a design change is required in, for example, the distance between the base end parts, it is relatively easily realized by changing an assembly angle of the pair of the profile beams. When the base end parts are processed for the purpose of easy welding of the bush or the like for swingably connecting the arms to the vehicle body, an appropriate shape can be obtained by simple processing of merely cutting out an end part of a vertical plate part of the U-shaped cross section into a shape of an arc.

In one preferred embodiment of the present invention, two parallel upper face parts of one of the profile beams are brought into contact with and overlapped with respective two parallel lower face parts of the other of the profile beams, and the pair of the profile beams are welded and joined together along an overlap edge.

With this configuration, since the plates forming the profile beams are overlapped in the vertical direction and welded, a welding operation is simpler, as compared with a method in which end faces of the pair of the profile beams are brought into contact at the same height level and welded. In addition, at a welding part, high rigidity is obtained due to the overlapped plates. Further, an overlap width in the front-rear direction between the plates can be appropriately adjusted so as to realize a desired finished size of the arm member, the arm member itself is not required to have high dimension accuracy, and consequently the cost can be reduced. Moreover, with this configuration, since an ideal weld surface (lap joint) is formed of two orthogonal faces including an upper face of a lower plate and an end face of an upper plate at a position where two plates are overlapped, a welding operation becomes very easy, and high weld strength is easily obtained. Further, in a case where two parallel plate parts of a U-shape of one of the profile beams is inserted into an opening of a U-shape of the other of the profile beams, the profile beams should have two different sizes (large and small) in the U-shape, while with the present configuration, the pair of the profile beams can be shaped to have exactly the same size.

In another preferred embodiment of the present invention, each of the profile beams is formed from a single plate by bending processing. With this configuration, as compared with a configuration in which the profile beam is obtained by a method in which three plates are welded, the profile beam can be fabricated in a shorter time, and higher reliability in strength can be obtained.

In other embodiment of the present invention, a maximum length in the front-rear direction of the distal end part of each of the profile beams has at least the front-rear length of a distal end part of the arm. With this configuration, the arm can easily exert satisfactory strength relative to a stress in the front-rear direction of the vehicle. In addition, since the overlap edge of the pair of the profile beams is not in the vicinity of a central portion in the front-rear direction but in the vicinity of the vertical plate part, strength in the vertical direction at a part unified by welding can be easily secured. Moreover, an area for attaching a lower end of damper for supporting a vehicle body weight can be easily secured in an upper face of the arm.

In still other embodiment of the present invention, the pair of the profile beams are connected at the base end part thereof to a single cross-bush, and the base end part is pivoted on the vehicle body side through the cross-bush. With this configuration, regardless of the length of the profile beam in the front-rear direction, the connection with the cross-bush is possible, as compared with a configuration in which the base end parts of the pair of the profile beams are independently connected to the respective separate cross-bushes.

DETAILED DESCRIPTION OF PREFERRED EMBODIMENTS

Hereinbelow, embodiments of the present invention will be described in detail with reference to the accompanying drawings.

Figure 1:
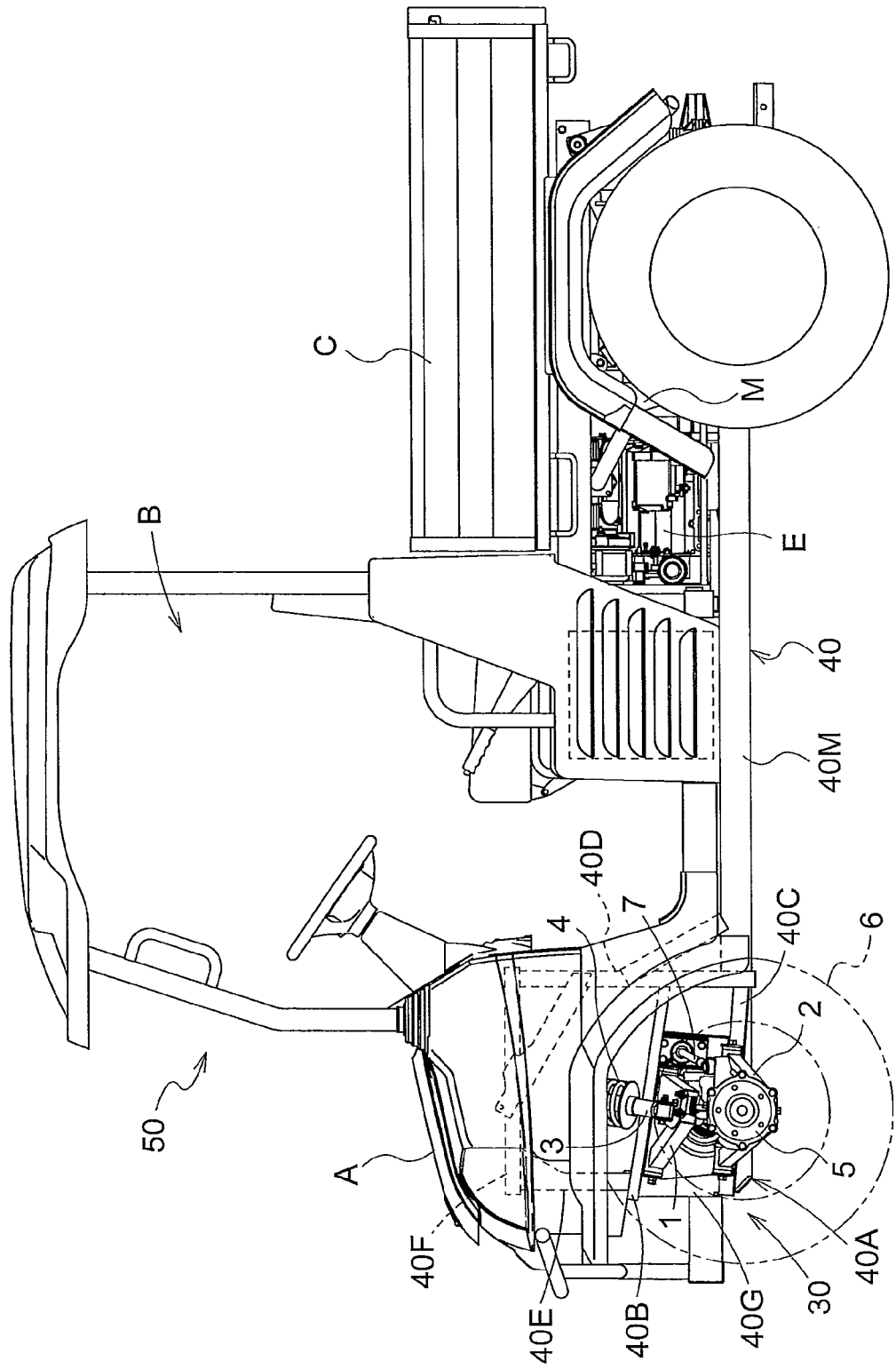
FIG. 1 is a side view showing a vehicle to which a suspension device according to the present invention is applied.

FIG. 1 shows a four-wheel drive type vehicle 50. Between steered wheels 6 as front wheels of the vehicle 50 and a body frame 40, a suspension device 30 according to the present invention is disposed. It should be noted that a basic configuration of this suspension device is also applicable to non-steered wheels.

In this embodiment, a multi-purpose work vehicle is used as the vehicle 50, which includes: a bonnet A disposed in a front part of a vehicle body; a driving part B disposed in an intermediate part of the vehicle body in a front-rear direction, between the steered wheels 6 and rear driving wheels; an engine E and a transmission case M disposed in a rear part of the vehicle body; and a truck box C disposed above the engine E and the transmission case M in the rear part of the vehicle body.

(Configuration of Suspension Device)

The suspension device 30 is of a double wishbone type which includes: right and left upper arms 1 and right and left lower arms 2 all vertically swingably supported by a lower part of the body frame 40; a shock absorber 3 supported by an upper face of the upper arm 1; and the like. It should be noted that a structure formed mainly of the upper arm 1 and the lower arm 2 corresponds to a suspension arm unit.

Figure 2:
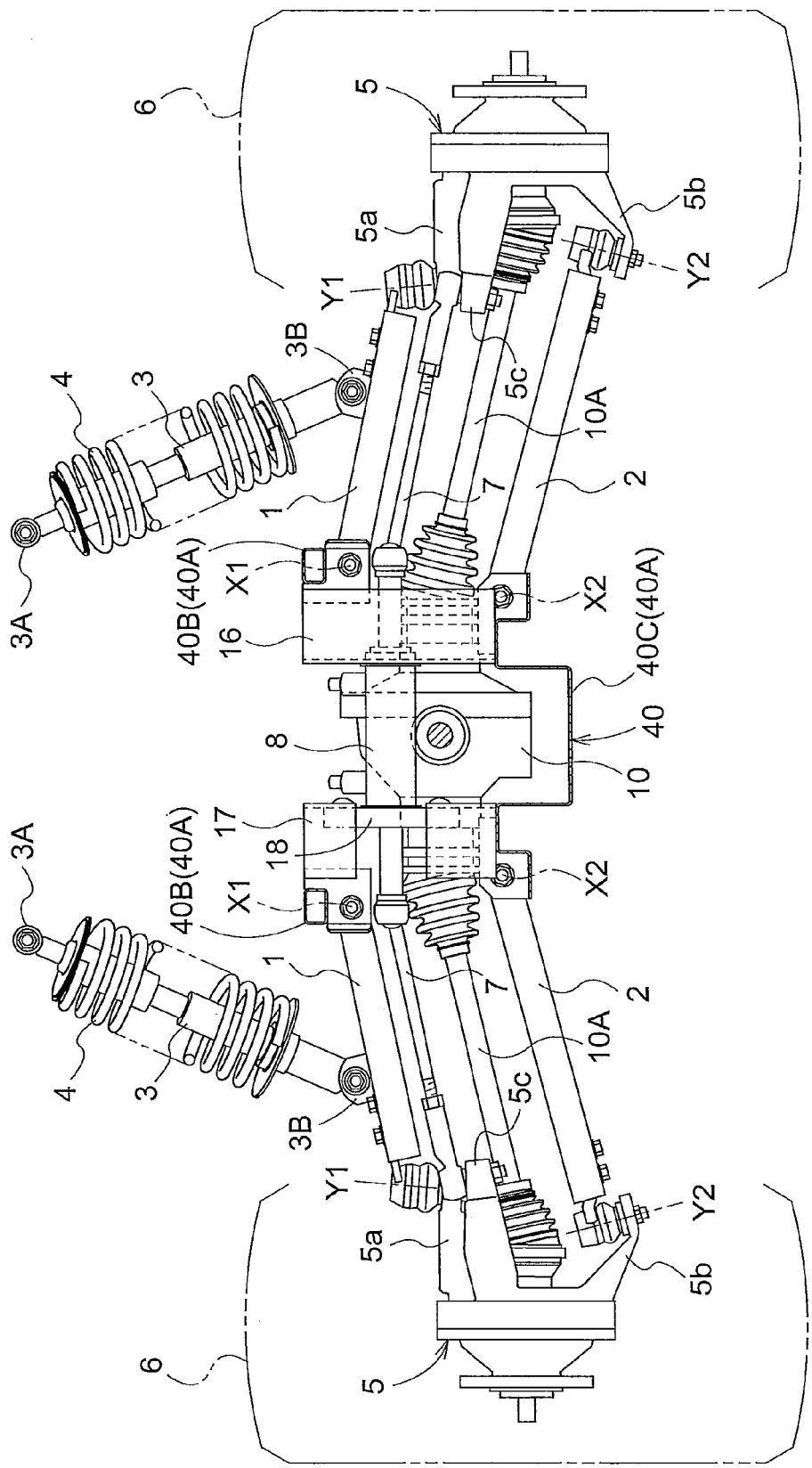
FIG. 2 is a rear view showing a part around steered wheels of the vehicle.

To front end parts of right and left main frames 40M forming the body frame 40, a box-shaped front frame 40A for attaching the suspension device 30 is connected while reinforced with reinforcing frames. The front frame 40A includes: right and left longitudinal frames 40B each of which extends frontward in an obliquely upward direction and is disposed at an intermediate level in a vertical direction in the front frame A; a lower frame 40C which extends frontward in the obliquely upward direction and is disposed at a lower level of the front frame A; right and left rear vertical frames 40D standing on the front end parts of the right and left main frames 40M, respectively; right and left front vertical frames 40E which stand on front end parts of the right and left longitudinal frames 40B, respectively, and each of which extends upward in an obliquely outward direction; an upper frame 40F connecting upper end parts of the rear and front vertical frames 40D,40E to one another; reinforcing frames for reinforcing these frames one another; and the like. A rear end side of each of the right and left longitudinal frames 40B is connected to a transversal frame (not shown) connecting the right and left rear vertical frames 40D to each other, and a front end side of each of the right and left longitudinal frames 40B is connected to a front frame 40G standing on a front end part of the lower frame 40C. As shown in FIG. 2, the lower frame 40C is configured to have a cross section including a central portion in a transversal direction in a shape of a sagging recess and lateral portions each crankwise folded, and a rear end side of the lower frame 40C is connected to a transversal frame (not shown) connecting the right and left main frames 40M.

Figure 4:
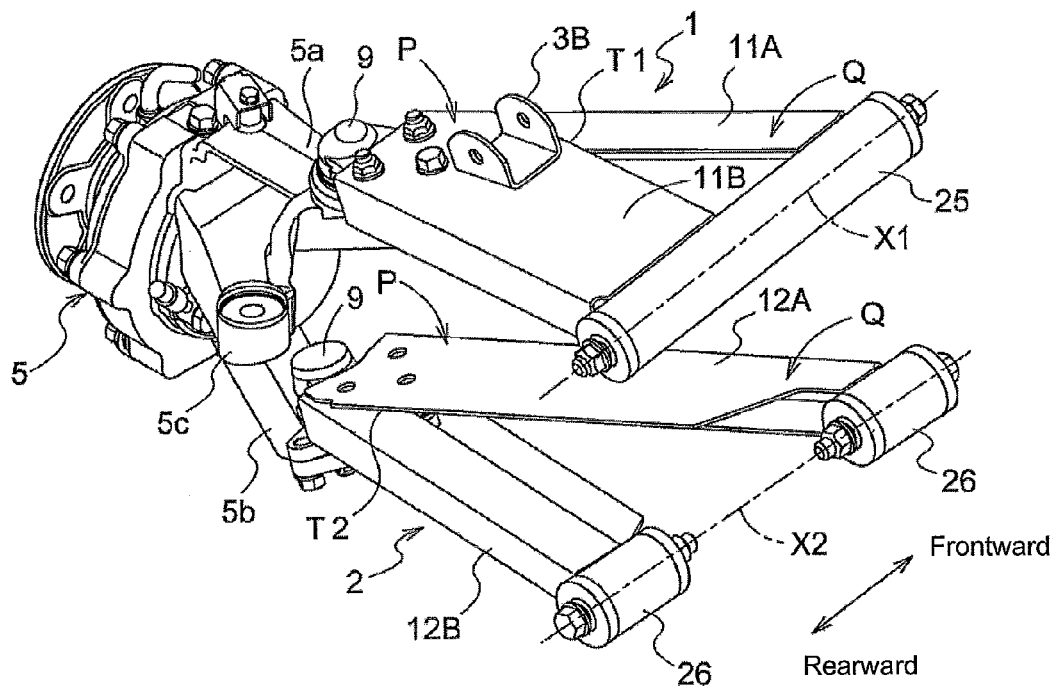
FIG. 4 is a perspective view showing the suspension device.

Referring to FIG. 2, an upper end part of the shock absorber 3 is connected to an upper part of the front frame 40A of the body frame 40 through a mount 3A so as to support a vehicle body weight, and a coil spring 4 is wound around an intermediate part of the shock absorber 3. As shown in FIG. 4, on distal end parts P of the upper arm 1 and the lower arm 2, a knuckle arm unit 5 rotatably supporting the steered wheel 6 is supported swingably about vertical axes Y1,Y2. In addition, base end parts Q of the upper arm 1 and the lower arm 2 are supported swingably about horizontal axes X1,X2, respectively, on a lower part of the front frame 40A of the body frame 40.

Figure 3:
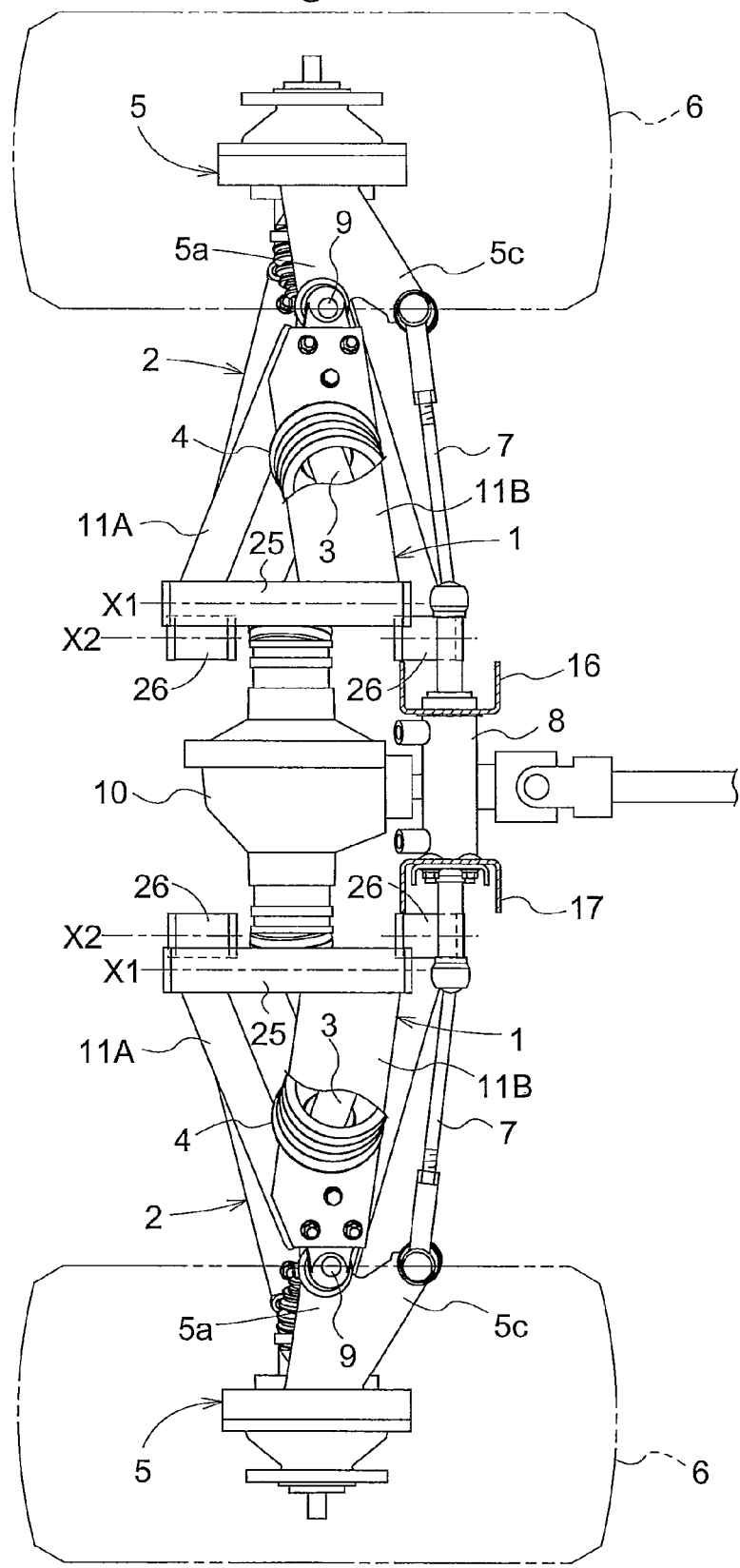
FIG. 3 is a plan view showing the part around the steered wheels of the vehicle.

The arm 1 and the arm 2 are connected to an upper end 5a and a lower end 5b, respectively, of the knuckle arm unit 5, each through a ball joint 9 attached to the distal end part P. As shown in FIG. 3, to an operated portion 5c of the knuckle arm unit 5, a tie rod 7 is connected which is configured to perform a swinging operation of the steered wheel 6 in accordance with an input from a steering wheel (not shown).

As shown in FIGS. 2 and 3, a steering member 8 is placed between the right and left tie rods 7. Herein, the steering member 8 is of a hydraulic cylinder type configured to perform a push-pull operation of the tie rod 7 in the transversal direction in accordance with oil transferred based an operation of the steering wheel. Alternatively, other steering member, such as those of rack-and-pinion type, may be used.

Between the steered wheels 6, a differential device 10 connected to an output shaft of the engine E is disposed, and drive shafts 10A extending laterally from the differential device 10 are connected to the respective steered wheels 6 through the respective knuckle arm units 5.

Figure 5:
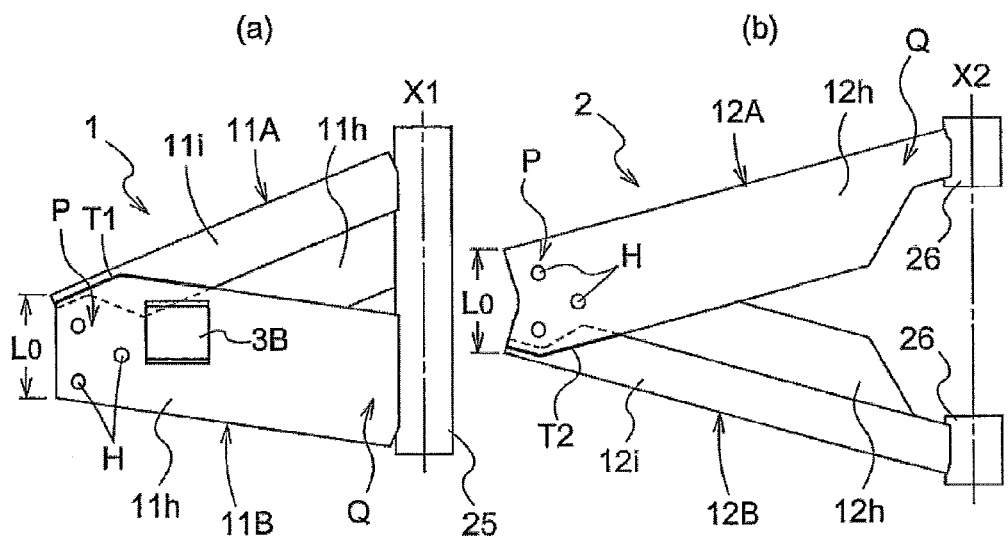
FIG. 5 is a plan view showing an upper arm and a lower arm of the suspension device.
Figure 6:
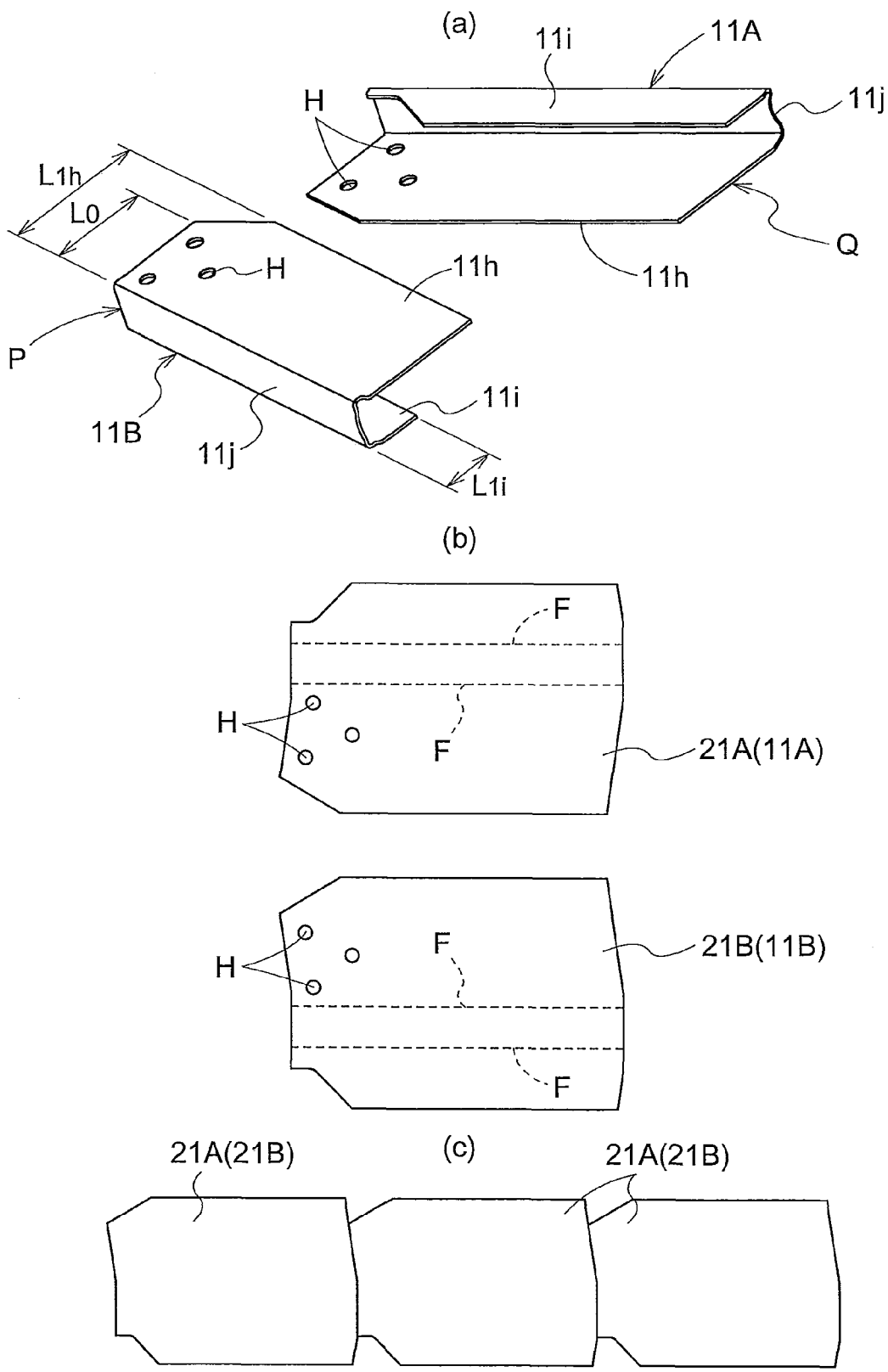
FIG. 6 is an exploded explanatory diagram showing the upper arm.

As shown in FIGS. 4-6, the upper arm 1 is formed of a pair of profile beams 11A,11B each having the same U-shaped cross section and obtained by welding the profile beams 11A, 11B arranged in such a manner that openings of the U shapes (hereinafter,) of the profile beams 11A,11B face each other and the profile beams 11A,11B become gradually apart from each other from the distal end part P connected with the knuckle arm unit 5 to the base end part Q connected with the front frame 40A of the body frame 40. Specifically, the profile beams 11A,11B are overlapped with each other in the distal end part P, in such a manner that two parallel upper face parts of the profile beam 11A positioned frontward are brought into contact with respective two parallel lower face parts of the profile beam 11B positioned rearward, and as shown in FIG. 5(a), the profile beams 11A,11B are welded together along two overlap edges T1 between the upper face and the lower face to be unified into a single piece. It should be noted that the "U shape" herein is intended to include a square U shape.

Likewise, the lower arm 2 is formed of a pair of profile beams 12A,12B each having the same U-shaped cross section and obtained by welding the profile beams 12A,12B arranged in such a manner that openings of the U shapes of the profile beams 12A,12B face each other and the profile beams 12A, 12B become gradually apart from each other from the distal end part P to the base end part Q. Specifically, the profile beams 12A,12B are overlapped with each other in the distal end part P, in such a manner that two parallel upper face parts of the profile beam 12A positioned frontward are brought into contact with respective two parallel lower face parts of the profile beam 12B positioned rearward, and as shown in FIG. 5(b), the profile beams 12A,12B are welded together along two overlap edges T2 between the upper face and the lower face to be unified into a single piece.

As shown in FIG. 6(a), each of the profile beams 11A,11B forming the upper arm 1 includes: a first transversal plate part 11h and a second transversal plate part 11i extending in parallel with each other; and a vertical plate part 11j connecting the transversal plate parts 11h,11i. A front-rear length L1h of the first transversal plate part 11h is set longer than a front-rear length L0 in the distal end part P, and a front-rear length L1i of the second transversal plate part 11i is set shorter than the L1h.

Figure 7:
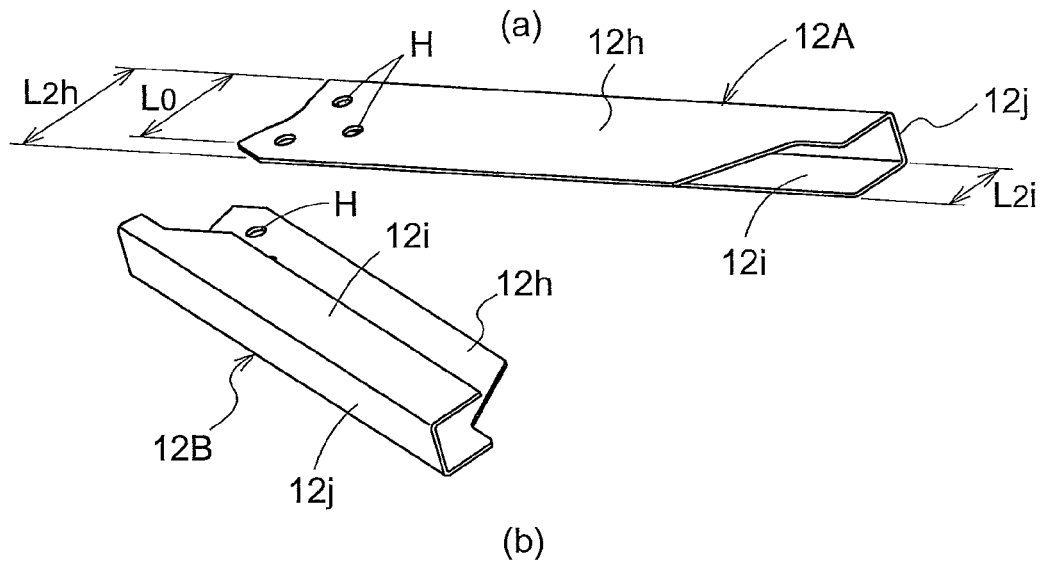
FIG. 7 is an exploded explanatory diagram showing the lower arm.
Figure 7:
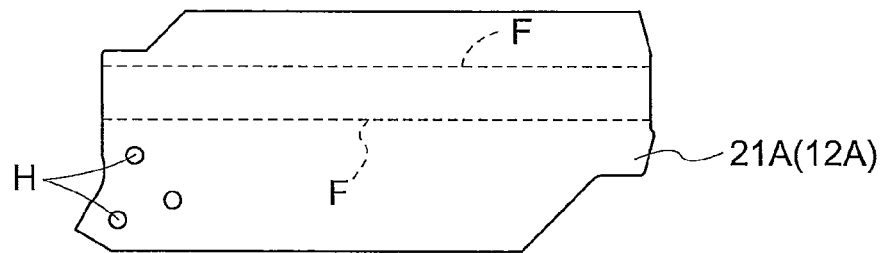
Figure 7:
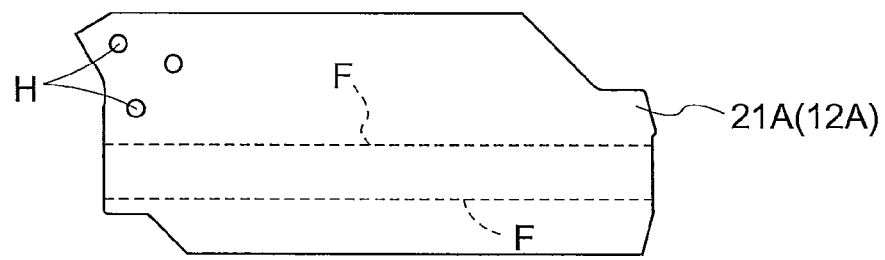
Figure 8:
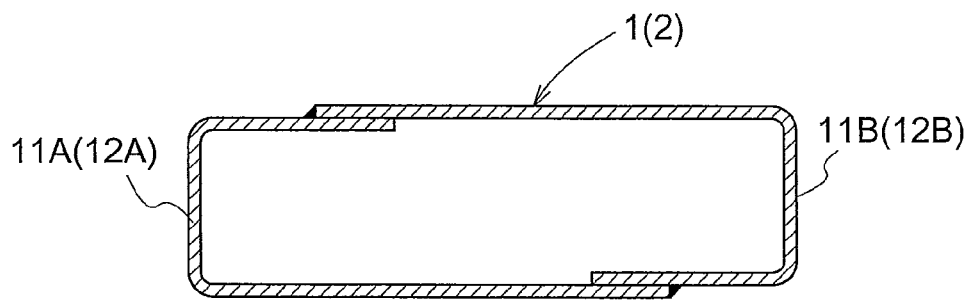
FIG. 8 is a schematic cross section of the upper arm and the lower arm.

Likewise, as shown in FIG. 7(a), each of the profile beams 12A,12B forming the lower arm 2 includes: a first transversal plate part 12h and a second transversal plate part 12i extending in parallel with each other; and a vertical plate part 12j connecting the transversal plate parts 12h,12i. A front-rear length L2h of the first transversal plate part 12h is set longer than the front-rear length L0 in the distal end part P, and a front-rear length L2i of the second transversal plate part 12i is set shorter than the L2h.

As shown in FIG. 6(b), the profile beams 11A,11B forming the upper arm 1 can be obtained by cutting out flat plates 21A,21B from a steel plate with a laser cutter or the like, and performing bending processing in which each of the flat plates 21A,21B is folded in valley folds along two parallel broken lines F.

It should be noted that, since the plates 21A,21B are in a complete mirror-image form, the profile beams 11A,11B can be obtained from two plates (21A or 21B) having the same shape and size (FIG. 6(c)), by folding one of the plates in valley folds, and folding the other in mountain folds.

As shown in FIG. 7(b), the profile beams 12A,12B forming the lower arm 2 can be obtained by performing bending processing in which each of flat plates 22A,22B is folded in valley folds along the two parallel broken lines.

Since the plate 22A,22B are also in a complete mirror-image form, the profile beams 12A,12B can be obtained from two plates (22A or 22B) having the same shape and size, by folding one of the plates in valley folds, and folding the other in mountain folds.

Around the distal end parts P of the upper arm 1 and the lower arm 2, it is necessary to form through holes H for screwing the ball joint 9. The formation of the through holes H may be performed before the bending processing in which the plates (21A,21B,22A,22B) are folded along the broken lines F, or may be performed after welding of the profile beams (11A,11B or 12A,12B) along the overlap edges (T1 or T2) to unify them.

As shown in FIGS. 4 and 5(a), to a relevant part of the upper face of the upper arm 1 obtained by unifying the profile beams 11A,11B through welding, a bracket 3B for pivotally supporting a base end part side of the shock absorber 3 is welded.

Referring to FIGS. 4, 5(a) and 6, in each of a pair of the base end parts Q of the upper arm 1, an end face of the vertical plate part 11j is cut out in a shape of an arc convexing toward the distal end part P. The pair of the base end parts Q are welded to a single bush 25 (i.e., cross-bush or bridging sleeve) and pivoted on the longitudinal frame 40B of the front frame 40A through the bush 25.

Likewise, referring to FIGS. 4 and 5(b), in each of a pair of the base end parts Q of the lower arm 2, an end face of the vertical plate part 12j is cut out in a shape of an arc. The pair of the base end parts Q are welded to respective two separate bushes (cross-bush) 26 and are pivoted on the lower frame 40C of the front frame 40A through the bushes 26.

As shown in FIG. 4, when the upper arm 1 and the lower arm 2 are pivoted on the front frame 40A of the body frame 40, in each of the arms 1,2, the openings of the U shapes face each other in the front-rear direction of the vehicle.

In the embodiment described above, each of the upper arm 1 and the lower arm 2 has, in a planar view, a shape of an isosceles triangle having a median line perpendicular to a line in the front-rear direction of the vehicle, from which triangle a part is removed. Alternatively, the median line may be inclined frontward relative to the line in the front-rear direction of the vehicle. In this case, in each arm, the pair of the profile beams are in different shapes to some degree. However, as compared with a method in which a closed rectangular cross-section is obtained by bending processing, the following basic advantages can be retained: the profile beams can be obtained by bending processing using a typical mold and a simple press technique; a design change in, for example, the distance between the base end parts, is relatively easy; an operation of processing the base end parts can be easily performed, for the purpose of easy welding of the bush or the like for swingably connecting the arms 1,2 to the body frame 40.

(Structure for Mounting Steering Member)

Figure 9:
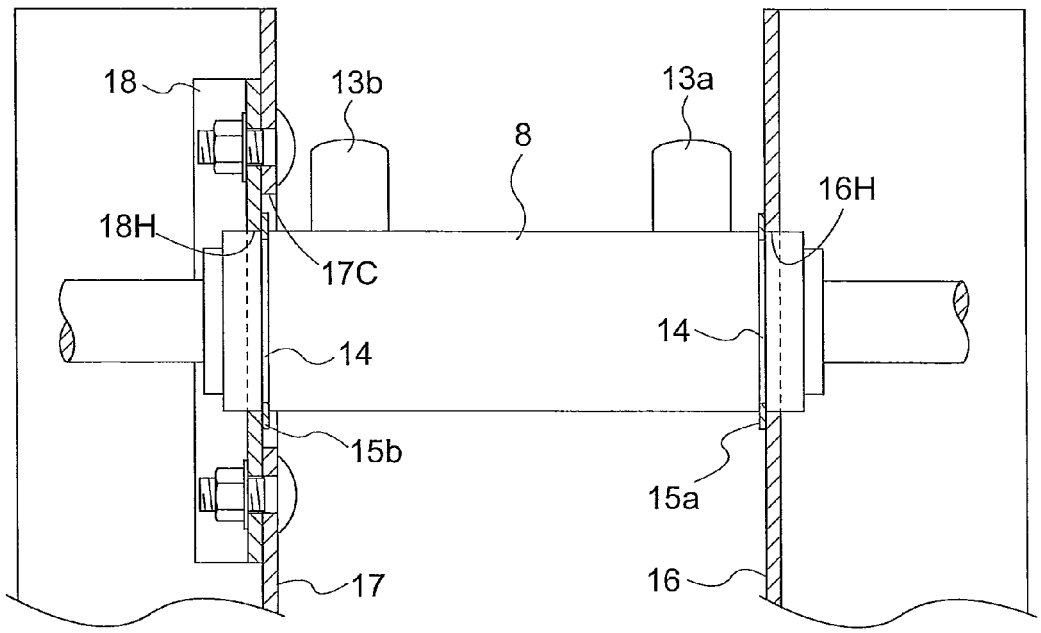
FIG. 9 is a plan view showing a mounting structure for a steering member.

FIG. 9 shows a structure for mounting the steering member 8 on the front frame 40A of the body frame 40. On an outer periphery of the steering member 8, a first input port 13a for inputting a hydraulic pressure for right turn operation and a second input port 13b for inputting a hydraulic pressure for left turn operation are disposed with an interval in the transversal direction. In addition, C-rings 15a,15b are engageably inserted into a pair of annular grooves 14 formed outward of the input ports 13a,13b in the transversal direction, respectively, each of which C-rings 15a,15b has an outer diameter larger than an outer diameter of the steering member 8.

In addition, as shown in FIG. 2, the structure for mounting the steering member 8 includes: a first bracket 16 and a second bracket 17 extending upward from the lower frame 40C of the front frame 40A; and a retainer plate 18 in a shape of a single rectangular flange screwable to the second bracket 17.

Figure 10:
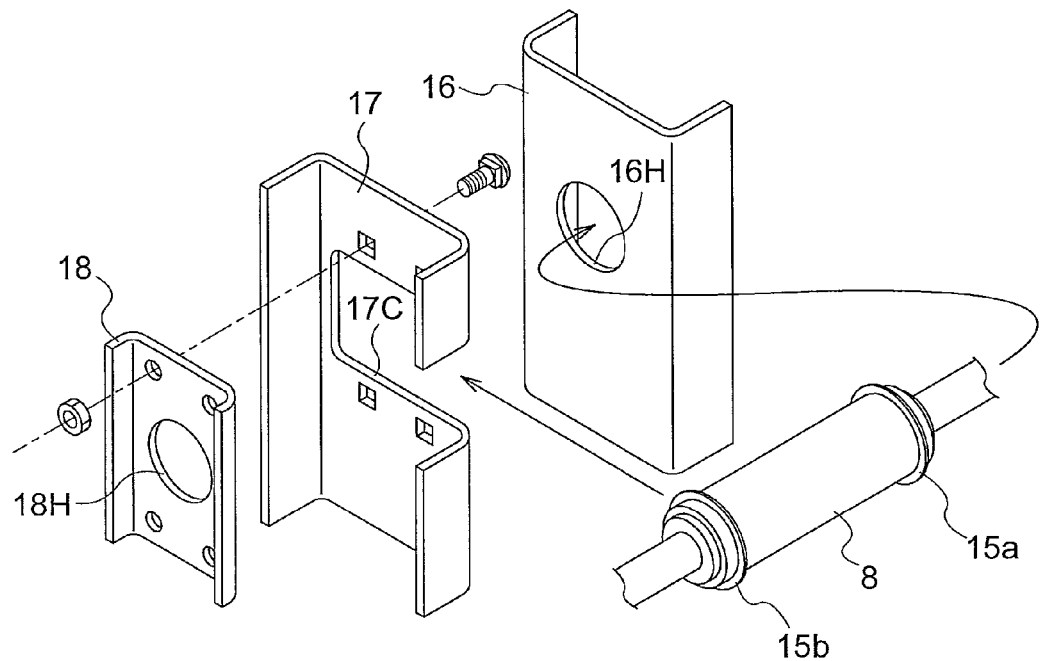
FIG. 10 is an exploded perspective view showing the mounting structure for the steering member.

As shown in FIG. 10, in the first bracket 16 disposed in a right side area of the lower frame 40C, a through hole 16H is formed whose inner diameter is smaller than the outer diameter of the C-ring 15a. On the other hand, in the second bracket 17 disposed in a left side area of the lower frame 40C, a rectangular cutout 17C is formed whose opening is oriented to a rear side in the vehicle body direction. A vertical width of the cutout 17C is much larger than the outer diameter of the C-ring 15b. In the retainer plate 18, a through hole 18H is formed whose inner diameter is slightly larger than the outer diameter of the steering member 8 and smaller than the outer diameter of the C-ring 15b.

Upon assembling the steering member 8, as indicated with arrows in FIG. 10, first a right end part of the steering member 8 obliquely oriented in a planar view relative to the through hole 16H of the first bracket 16 is inserted from the rear side in the vehicle body direction, and next, a left end part of the steering member 8 is introduced into the cutout 17C of the second bracket 17, to thereby arrange the steering member 8 directly horizontal. In this state, a position of the second bracket 17 is set in such a manner that, when the C-ring 15a engageably inserted on a right side of the steering member 8 is brought into contact with an inner face of the first bracket 16, an outer face of the C-ring 15b on a left side and an outer face of the second bracket 17 lie in the same plane. Then, the retainer plate 18 is fitted onto the left end of the steering member 8, and brought into contact with the outer face of the second bracket 17, and the retainer plate 18 and the second bracket 17 are fixed with screws. As a result, a pair of the C-rings 15a,15b fixed to the outer periphery of the steering member 8 are sandwiched between the first bracket 16 and the retainer plate 18, to thereby complete the assembling of the steering member 8.

Other Embodiments

<1> In the upper arm 1 and the lower arm 2, the first transversal plate part and the second transversal plate part connected through the vertical plate part may have the same front-rear length.

Figure 11:
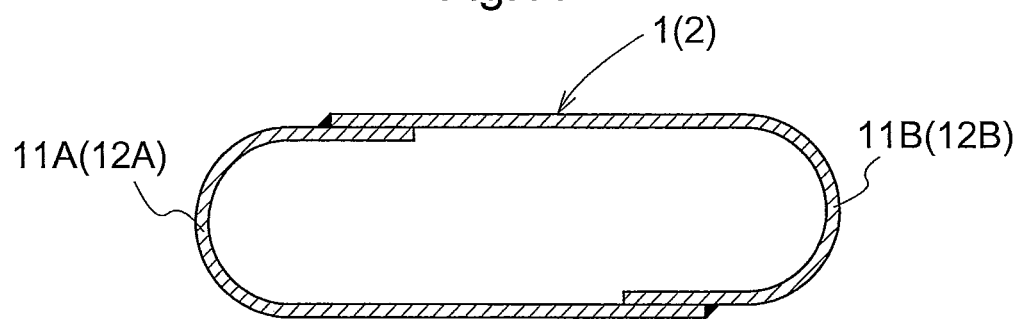
FIG. 11 is a schematic cross section of the arms according to another embodiment.

<2> In the embodiment described above, the profile beam of the arm has a cross section in which the transversal plate parts extending in parallel with each other are connected through the flat vertical plate part. Alternatively, as illustrated in FIG. 11, the profile beam may have a cross section in which the transversal plate parts extending in parallel with each other are connected through a curved vertical plate part, such as those in a shape of an arc.

Figure 12:
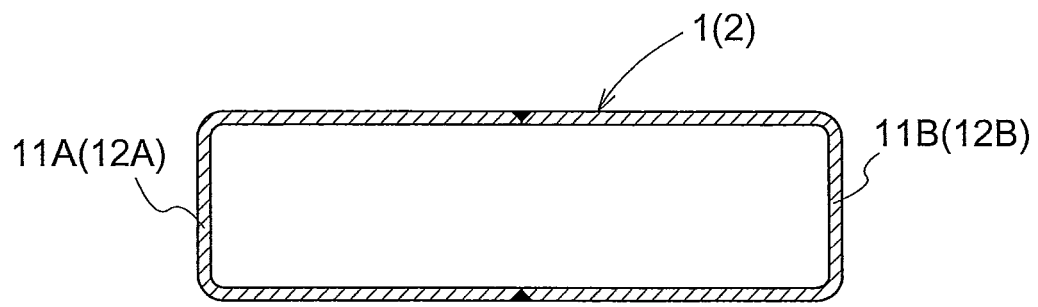
FIG. 12 is a schematic cross section of the arms according to still another embodiment.

<3> In the embodiment described above, two parallel upper face portions of one of the profile beams are brought into contact with and overlapped with respective two parallel lower face portions of the other of the profile beams, and along the overlap edges, the pair of the profile beams are welded together. Alternatively, as illustrated in FIG. 12, the pair of the profile beams may be joined by abutting end faces of the profile beams to each other at the same height level, and welding the butted faces.

The present invention is applicable not only to the multi-purpose work vehicle but also to other work vehicles, such as tractor, and other vehicles, such as truck and passenger vehicle, as structure of the arm for suspension having: the base end part vertically swingably supported on the vehicle body side about the axis extending in the front-rear direction of the vehicle; and the distal end part to which the knuckle arm unit of the wheel is attached.

What is claimed is:

1. A suspension arm unit for vehicle comprising:
   a pair of profile beams each having a U-shaped cross section with an opening oriented in a horizontal direction, each profile beam including:
   a base end part which is formed on one end side of the profile beam and vertically swingably supported on a vehicle body side about an axis extending in a front-rear direction of a vehicle body; and
   a distal end part which is formed on the other end side of the profile beam and to which a knuckle arm unit of a wheel is attached;
   wherein the pair of the profile beams are arranged in the front-rear direction of the vehicle body so that the openings face each other in the front-rear direction of the vehicle body and a gap between the profile beams becomes larger from the distal end part to the base end part,
   wherein the distal end parts of the pair of the profile beams are overlapped with each other, and
   wherein the pair of the profile beams are connected to each other at the distal end part thereof and connected to the knuckle arm unit through a rotary joint.

2. The suspension arm unit according to claim 1, wherein the pair of the profile beams are welded and joined at an overlap edge in the distal end part.

3. The suspension arm unit according to claim 1, wherein the distal end parts of the pair of the profile beams are alternately combined so that the distal end part of the profile beam is positioned in the opening of the counterpart profile beam.

4. The suspension arm unit according to claim 1, wherein each of the pair of the profile beams is an article obtained by bending processing.

5. The suspension arm unit according to claim 1, wherein the base end parts of the pair of the profile beams are connected to each other through a cross-bush extending in the front-rear direction of the vehicle body, and vertically swingably supported on the vehicle body side through the cross-bush.

* * * * *